United States Patent
Piber

(10) Patent No.: US 8,487,735 B2
(45) Date of Patent: Jul. 16, 2013

(54) VARISTOR CERAMIC, MULTILAYER COMPONENT COMPRISING THE VARISTOR CERAMIC, AND PRODUCTION METHOD FOR THE VARISTOR CERAMIC

(75) Inventor: Monika Piber, Anger (AT)

(73) Assignee: EPCOS AG (DE)

( * ) Notice: Subject to any disclaimer, the term of this patent is extended or adjusted under 35 U.S.C. 154(b) by 0 days.

(21) Appl. No.: 13/146,450

(22) PCT Filed: Feb. 1, 2010

(86) PCT No.: PCT/EP2010/051188
§ 371 (c)(1),
(2), (4) Date: Sep. 14, 2011

(87) PCT Pub. No.: WO2010/089279
PCT Pub. Date: Aug. 12, 2010

(65) Prior Publication Data
US 2011/0319255 A1    Dec. 29, 2011

(30) Foreign Application Priority Data

Feb. 3, 2009   (DE) .......................... 10 2009 007 234
Jun. 4, 2009   (DE) .......................... 10 2009 023 846

(51) Int. Cl.
   *H01C 7/10*   (2006.01)
(52) U.S. Cl.
   USPC ................... 338/21; 338/13; 338/20

(58) Field of Classification Search
   USPC ................................................. 338/21
   See application file for complete search history.

(56) References Cited

U.S. PATENT DOCUMENTS

| | | | |
|---|---|---|---|
| 6,100,785 A * | 8/2000 | Kato et al. ................... 338/20 |
| 7,791,450 B2 * | 9/2010 | Choi et al. ................... 338/22 R |
| 7,969,277 B2 | 6/2011 | Matsuoka | |
| 7,994,893 B2 * | 8/2011 | Matsuoka .................. 338/21 |
| 2009/0015367 A1 | 1/2009 | Matsuoka | |

FOREIGN PATENT DOCUMENTS

| | | |
|---|---|---|
| DE | 0 617 436 A1 | 9/1994 |
| DE | 10 2008 031 663 A1 | 1/2009 |
| JP | 2002-246207 A | 8/2002 |

OTHER PUBLICATIONS

Lionel M. Levinson et al., "The physics of metal oxide varistors," Journal of Applied Physics, vol. 46, No. 3, Mar. 1975, pp. 1332-1341.
J.S. Park et al., "Effects of Y2O3 on the microstructure and electrical properties of Pr—ZnO varistors," Journal of Materials Science: Materials in Electronics, vol. 16, No. 4, Apr. 2005, pp. 215-219.
C.-W. Nahm, "The effect of sintering temperature on varistor properties of (Pr, Co, Cr, Y, Al)-doped ZnO ceramics," Materials Letters, vol. 62, No. 29, Nov. 30, 2008, pp. 4440-4442.

\* cited by examiner

*Primary Examiner* — Kyung Lee
(74) *Attorney, Agent, or Firm* — DLA Piper LLP (US)

(57) ABSTRACT

A varistor ceramic includes the following materials: Zn as the main component, Pr in a proportion of 0.1 to 3 atom %, and a metal M selected from Y, Ho, Er, Yb and Lu in a proportion of 0.1 to 5 atom %.

12 Claims, 3 Drawing Sheets

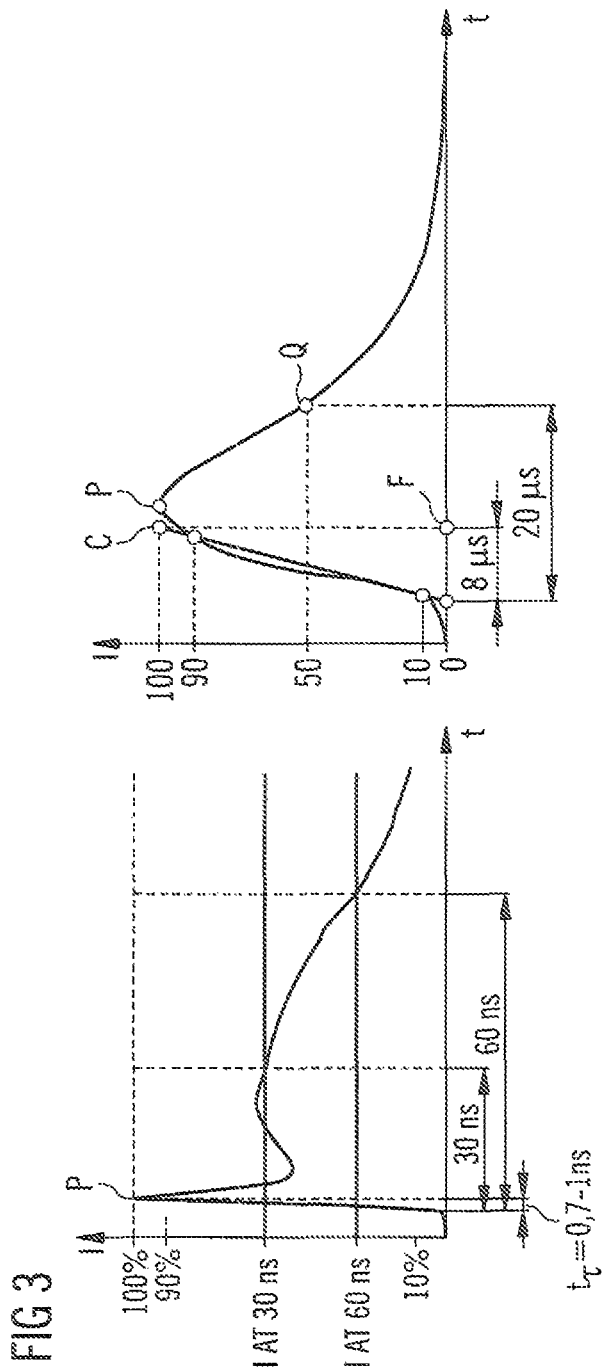

VARISTOR CERAMIC, MULTILAYER COMPONENT COMPRISING THE VARISTOR CERAMIC, AND PRODUCTION METHOD FOR THE VARISTOR CERAMIC

RELATED APPLICATIONS

This is a §371 of International Application No. PCT/EP2010/051188, with an international filing date of Feb. 1, 2010 (WO 2010/089279 A2, published Aug. 12, 2010), which is based on German Patent Application No. 10 2009 007 234.9, filed Feb. 3, 2009, and 10 2009 023 846.8, filed Jun. 4, 2009, the subject matter of which is incorporated by reference.

TECHNICAL FIELD

This disclosure relates to a varistor ceramic, methods for producing the varistor ceramics and multilayer components made from the varistor ceramic.

BACKGROUND

A widespread problem of varistor ceramics is achieving a low dielectric constant ($\in_r$). At the same time, high nonlinearity, sufficiently great switching capacity in the high-current range (ESD, 8/20) and low leakage current should be achieved.

SUMMARY

I provide a varistor ceramic including Zn as the main component, Pr in a proportion of 0.1 to 3 atom %, based on the atom % of the ceramic varistor, and at least one metal M selected from the group consisting of Y, Ho, Er, Yb and Lu in a proportion of 0.1 to 5 atom %.

I also provide a method for producing the varistor ceramic including a) calcining a raw ceramic material, b) producing a slurry containing the raw ceramic material, c) preparing green foils from the slurry, d) debinding the green foils and e) sintering debound green foils.

BRIEF DESCRIPTION OF THE DRAWINGS

FIG. 1 shows the production process of multilayer varistors as a schematic flow diagram, including the process steps: A1 Initial weight, A2 Pre-grinding, A3 Drying, A4 Screening, A5 Calcination, A6 Post-grinding, A7 Drying, A8 Screening, B1 Slurrying, B2 Green foils, C1 Printing with conductive paste, C2 Stacking, C3 Cutting, D1 Decarburizing, D2 Sintering, E1 Attaching external terminals, E2 Burning-in.

FIG. 3 shows the characteristic curve of an EDS pulse on the left, and the characteristic curve of an 8/20 pulse on the right.

REFERENCE LIST

Figure 1:
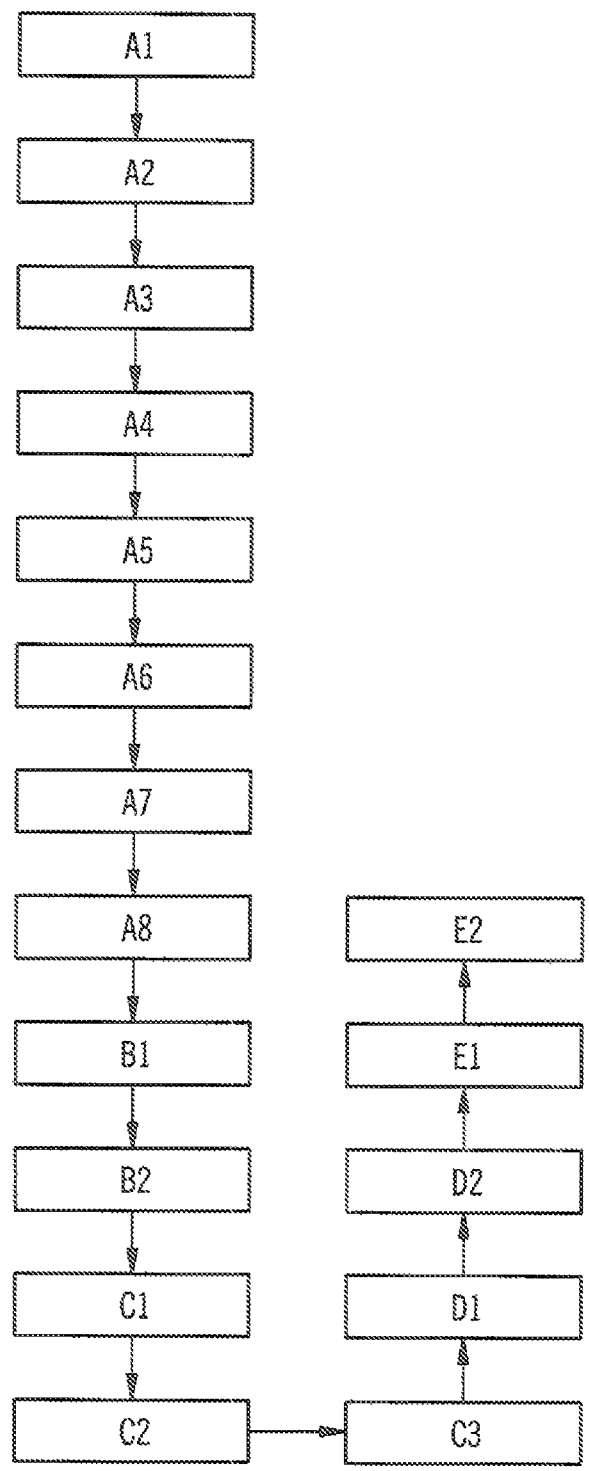

1) Inner electrode
2) Varistor ceramic material
3) External terminal

DETAILED DESCRIPTION

Varistors are voltage-dependent resistors and are used for overvoltage protection.

I provide a varistor ceramic comprising the following materials:

Zn as the main component,

Pr in a proportion of 0.1 to 3 atom %, a metal M selected from Y, Ho, Er, Yb, Lu in a proportion of 0.1 to 5 atom %, based on the atom % of the varistor ceramic.

M may stand for Y or Lu.

The proportion of Co may be in a range from 0.1 to 10 atom %, wherein Co is preferably present as $Co^{2+}$.

The proportion of Ca may be in a range from 0.001 to 5 atom %, wherein Ca is preferably present as $Ca^{2+}$.

The proportion of Si may be in a range from 0.001 to 0.5 atom %, wherein Si is preferably present as $Si^{4+}$.

The proportion of Al may be in a range from 0.001 to 0.1 atom %, wherein Al is preferably present as $Al^{3+}$.

The proportion of Cr may be in a range from 0.001 to 5 atom %, wherein Cr is preferably present as $Cr^{3+}$.

The proportion of B may be in a range from 0.001 to 5 atom %, wherein B is preferably present as $B^{3+}$.

For high transmission rates of digital signals, multilayer varistors having a high ESD robustness and surge current stability and low capacitance are required. The low capacitance is required to influence the signal to be transmitted as little as possible.

The capacitance of a varistor is represented by the following formula:

$$C = \in_0 \in_r A/d, \tag{1}$$

where C is the capacitance, $\in_0$ is the permittivity of vacuum, $\in_r$ is the relative permittivity, A is the area between two electrodes, and d is the thickness of the layer between the electrodes.

The real dielectric constant $\in_{eff}$ for the intergranular material is described by the following formula, according to Levinson et al. (J. Appl. Phys. Vol. 46; No. 3; 1975):

$$C = \in_{eff} \in_0 [A/(z^*d)] \tag{2}$$

where C is the capacitance, $\in_0$ is the permittivity of vacuum, z is the number of grain-to-grain contacts between two electrodes, A is the area between the electrodes, and d is the thickness of the barrier layer of a grain-to-grain contact.

A conventional method of reducing the capacitance of a multilayer varistor (Eq. (1)) is to reduce the area A and to increase the layer thickness d. This runs contrary to the multilayer concept, however, because a reduction in the area A leads to a reduction in the maximum energy absorption capacity and thus the surge current stability and robustness with regard to ESD pulses.

The varistor ceramic may comprise, further to cobalt oxide and praseodymium oxide, additives of a salt or oxide of the metal M of lower basicity (small ionic radius), such as $Y^{3+}$ or $Lu^{3+}$ ($r_k^{3+}$=93 pm).

A lower polarizability of the barrier and control of the barrier properties (barrier height and width of the depletion layer) are thus achieved, and a varistor ceramic having a reduced capacitance per grain-to-grain contact while having high nonlinearity and ESD stability is obtained.

By reducing the capacitance per grain-to-grain contact, varistor components having lower capacitance for the same area between the electrodes, and thus equally good ESD robustness and surge current stability, are obtained.

The listed advantages are described in detail in representative examples.

An oxide or salt or the metal M, the cations thereof having a comparatively smaller ionic radius (e.g., $Y^{3+}$, $Lu^{3+}$), may be dissolved in the varistor ceramic so that the ceramic has a lower capacitance per grain-to-grain contact.

In one example, the oxides of praseodymium (0.1-3 atom %) and cobalt (0.1-10 atom %) as dopants and additionally calcium (0.001-5 atom %), silicon (0.001-0.5 atom %), aluminium (0.001-0.01 atom %), chromium (0.001-5 atom %) in oxide form and boron in bonded form (0.001-5 atom %) for controlling the microstructure formation in the sinteringing process, and yttrium in oxide form (0.1-5 atom %), are added to the ZnO.

The ceramic body of the multilayer varistor may be present as a monolithic ceramic body.

The multilayer varistor can be produced according to FIG. 1.

The components are initially weighed in oxide, dissolved or bonded form in the ratios indicated in Table 1 (A1), pre-ground (A2), dried (A3), screened (A4), and subsequently calcined (A5) between 400° C. and 1000° C., post-ground (A6), spray-dried (A7), and screened (A8).

A slurry is produced from the powder produced in that manner by adding a binder, dispersing agent, and solvent (B1), from which foils having a layer thickness of between 5 and 60 μm are drawn (B2), the foils subsequently being processed in a manner analogue to the process diagram in FIG. 1 to produce multilayer varistors. The green foils are printed with a conductive paste (C1), stacked, and then cut (C2, C3).

The binder is burned out of the green parts at temperatures between 180° C. and 500° C. in the following decarburization step (D1), and the components are sintered at a temperature between 900 and 1400° C. (D2). The external terminal layer (E1) is then applied, and the layer is burned in at temperatures between 500° C. and 1000° C. (E2).

Preferably, the sintering temperature in process step (D2) is between 1100° C. and 1400° C.

Further preferably, the temperature for burning in process step (E2) is between 600° C. and 1000° C.

Figure 2:
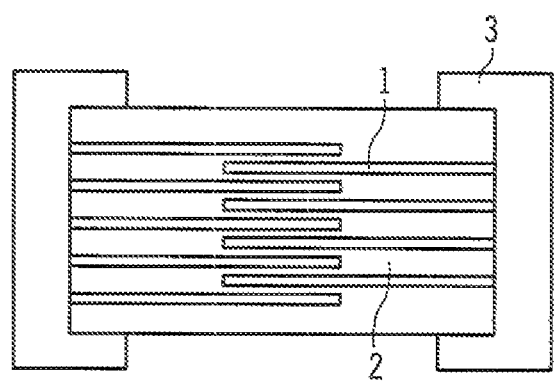
FIG. 2 shows schematically the construction of a multi-layer varistor including the inner electrodes (1), the varistor ceramic material (2) and the external terminals (3).

FIG. 2 shows a schematic side view of a multilayer component. The inner electrodes (1) and the layer of varistor ceramic material (2) follow an alternating sequence. The inner electrodes (1) are in each case connected alternately to one or the other of the external terminals (3). In the center region, the inner electrodes overlap (1).

A typical construction of a 0402 multilayer varistor (dimensions 1.0 mm×0.5 mm×0.5 mm) is shown in FIG. 2, wherein the overlap area of the inner electrodes (2) and the number of inner electrodes can be adapted to the desired electrical component characteristics.

The components are electrically characterized by determining the leakage current, the varistor voltage, the coefficient of nonlinearity, the 8/20 pulse stability, the ESD pulse stability, the 8/20 terminal voltage at 1 A ($U_K$).

FIG. 3 shows one pulse curve in each case on the left and right. The current I is plotted against time t in each case.

The specific varistor voltage $E_v$ is determined at 1 mA.

The capacitance is measured at 1 V and 1 kHz.

The ESD stability is determined from pulses in FIG. 3, left. To this end, the components were subjected to +/−10 ESD pulses (see FIG. 3, right). The percentage change in $U_v$ before and after pulsing, and the leakage current in percent before and after pulsing were calculated and must not show a percentage change of greater than 10%. Additionally, 8/20 robustness tests are performed (see FIG. 3, right, for pulse shape). The components were subjected to 8/20 pulses (see FIG. 3, right) at 1 A, 5 A, 10 A, 15 A, 20 A and 25 A, and the percentage change in the varistor voltage and the leakage current after loading were determined.

The coefficients of nonlinearity were determined using the following equations:

$$\alpha_1(10\ \mu A/1\ mA) = \log(1*10^{-3}/10*10^{-6})/\log(V_{10mA}/V_{10\mu A})$$

$$\alpha_2(1\ mA/1\ A) = \log(1/1*10^{-3})/\log(V_{1A}/V_{1mA})$$

$$\alpha_3(1\ mA/20\ A) = \log(20/1*10^{-3})/\log(V_{20A}/V_{1mA}).$$

Stability tests were performed with 80% AVR at 125° C. The leakage current $I_L$ should have no rising characteristic under the conditions.

TABLE 1

| initial weighing: (units in atom %) | | | | |
|---|---|---|---|---|
| | A | B | C | D |
| Zn | 97.9 | 97.4 | 96.9 | 96.4 |
| Co | 1.5 | 1.5 | 1.5 | 1.5 |
| Pr | 0.5 | 0.5 | 0.5 | 0.5 |
| Cr | 0.1 | 0.1 | 0.1 | 0.1 |
| Ca | 0.02 | 0.02 | 0.02 | 0.02 |
| Si | 0.02 | 0.02 | 0.02 | 0.02 |
| Y | 0 | 0.5 | 1 | 1.5 |
| B | 0.01 | 0.01 | 0.01 | 0.01 |
| Al | 60 ppm | 60 ppm | 60 ppm | 60 ppm |

TABLE 2

| | Electrical results | | | | | | | |
|---|---|---|---|---|---|---|---|---|
| Material | $E_v$ [V/mm] | $\epsilon_r$ | $\epsilon_r/E_v$ | $\alpha_1$ | $\alpha_2$ | $\alpha_3$ | 8/20 Stability | ESD Stability |
| A | 268 | 2200 | 8.2 | 11 | 8 | 7 | >20 A | >30 kV |
| B | 269 | 1737 | 7.9 | 18 | 10 | 8 | >20 A | >30 kV |
| C | 336 | 1316 | 3.7 | 17 | 11 | 9 | >20 A | >30 kV |
| D | 525 | 677 | 1.3 | 29 | 14 | 11 | >20 A | >30 kV |

The electrical data are summarized in Table 2. By adding yttrium, the specific varistor voltage increases from 268 V/mm to 525 V/mm, while the relative permittivity is reduced. The change can be attributed to the grain growth-inhibiting properties of yttrium compounds.

To obtain a parameter that is independent of grain size, the ratio $\epsilon_r/Ev$ was established. Table 2 shows that the ratio decreases with increasing yttrium addition. Simultaneously, with equally good nonlinearity, high ESD and 8/20 stability are achieved.

The proportion of Zn may preferably be greater than 90 atom %, wherein Zn is preferably present as $Zn^{2+}$.

The proportion of Pr may preferably be in a range from 0.5 to 0.6 atom %, wherein Pr is preferably present as $Pr^{3+/4+}$.

The proportion of M may preferably be in a range from 1 to 5 atom %, wherein M is preferably present as $M^{2+}/M^{3+}/M^{4+}$.

The proportion of Co may preferably be in a range from 1.5 to 2.0 atom %, wherein Co is preferably present as $Co^{2+}$.

The proportion of Ca may preferably be in a range from 0.01 to 0.03 atom %, wherein Ca is preferably present as $Ca^{2+}$.

The proportion of Si may preferably be in a range from 0.01 to 0.15 atom %, wherein Si is preferably present as $Si^{4+}$.

The proportion of Al may preferably be in a range from 0.005 to 0.01 atom %, wherein Al is preferably present as $Al^{3+}$.

The proportion of Cr may preferably be in a range from 0.05 to 0.2 atom %, wherein Cr is preferably present as $Cr^{3+}$.

The proportion of B may preferably be in a range from 0.001 to 0.01 atom %, wherein B is preferably present as $B^{3+}$.

The relative permittivity $\in_r$ may be less than 1000.

Owing to the avoidance of alkali metal carbonate additives, high reproducibility can be achieved in technical process control.

In the production process, boric oxide can be released from suitable precursors in the high temperature range as a sintering aid for controlling microstructure development, while avoiding evaporation losses to a great extent.

The multilayer varistors of types 0402 and 0201 are distinguished by excellent results for leakage current, ESD stability, 8/20 robustness, long-term stability and nonlinearity.

"Main component" is understood as meaning a proportion of at least 50 atom %. The proportion of Zn is preferably greater than 70 atom %, wherein Zn is preferably present as $Zn^{2+}$.

The production method may comprise the process steps:
a) calcining the raw ceramic material,
b) producing a slurry,
c) preparing green foils,
d) debinding the green foils, and
e) sintering the green foils from d).

The method may additionally comprise between process steps d) and e) the process step d1) constructing a component.

The invention claimed is:

1. A varistor ceramic comprising:
   Zn as the main component,
   Pr in a proportion of 0.1 to 3 atom %, based on the atom % of the ceramic varistor,
   at least one selected from the group consisting of Ca in a proportion of 0.001 to 5 atom %, based on the atom % of the ceramic varistor, Si in a proportion of 0.001 to 0.5 atom %, based on the atom % of the ceramic varistor, B in a proportion of 0.001 to 5 atom %, based on the atom % of the ceramic varistor, and
   at least one metal M selected from the group consisting of Y, Ho, Er, Yb and Lu in a proportion of 0.1 to 5 atom %.

2. The varistor ceramic according to claim 1, wherein M is Y or Lu.

3. The varistor ceramic according to claim 1 further comprising Co in a proportion of 0.1 to 10 atom %, based on the atom % of the ceramic varistor.

4. The varistor ceramic according to claim 1, further comprising Al in a proportion of 0.001 to 0.01 atom %, based on the atom % of the ceramic varistor.

5. The varistor ceramic according to claim 1, further comprising Cr in a proportion of 0.001 to 5 atom %, based on the atom % of the ceramic varistor.

6. The varistor ceramic according to claim 1, further comprising:
   Co in a proportion of 0.1 to 10 atom %,
   Ca in a proportion of 0.001 to 5 atom %,
   Si in a proportion of 0.001 to 0.5 atom %,
   Al in a proportion of 0.001 to 0.1 atom %,
   Cr in a proportion of 0.001 to 5 atom %,
   B in a proportion of 0.001 to 5 atom, all based on the atom % of the ceramic varistor.

7. The varistor ceramic according to claim 1, having a relative permittivity $\in_r$ of less than 2000.

8. The varistor ceramic according to claim 1, wherein relative permittivity of the varistor material is reduced by adding M.

9. The varistor ceramic according to claim 1, having a sintering temperature between 1000 and 1300° C.

10. The varistor ceramic according to claim 1, containing substantially no alkali metals.

11. A multilayer component comprising a varistor ceramic according to claim 1, configured for an ESD protection.

12. A method for producing a varistor ceramic according to claim 1, comprising:
   a) calcining a raw ceramic material,
   b) producing a slurry containing the raw ceramic material,
   c) preparing green foils from the slurry,
   d) debinding the green foils,
   e) sintering debound green foils.

* * * * *